United States Patent Office 2,754,213
Patented July 10, 1956

2,754,213

EDIBLE SPREADS FROM VEGETABLE OILS

Edwin P. Jones and Earl B. Lancaster, Peoria, Ill., assignors to the United States of America as represented by the Secretary of Agriculture No Drawing. Application December 11, 1953,
Serial No. 397,799

6 Claims. (Cl. 99—123)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the manufacture of an oleaginous spread of the general character of margarine. It relates particularly to the manufacture of an oleaginous spread having a wide temperature range of plasticity or spreadability, and having other improved physical properties, especially those affecting organoleptic acceptance.

Oleaginous spread such as butter, margarine or the like have the common disadvantageous property of becoming liquid or semi-liquid at the higher atmospheric temperatures prevailing in warmer climates, and commonly encountered in temperate climates during summer. They also tend to become so hard as to be unspreadable at temperatures below about 40° F. These latter temperatures are commonly encountered over a large portion of the globe for the greater part, if not all of the year.

In application Serial No. 283,745, filed April 22, 1952, by Edwin P. Jones, Herbert J. Dutton and John C. Cowan, now Patent No. 2,718,468, issued September 20, 1955, a composition is disclosed which has a wide range of spreadable plasticity. This prior spread, for example, may be readily spread upon bread at temperatures of about 20° F., yet it has a firm consistency at temperatures above 100° F.

The spreads, made in accordance with the disclosure of the aforementioned application frequently show some graininess in texture, especially on storage. They also have a tendency to cling to the mouth, i. e. they have disadvantageous "get-away" characteristics. The term "get-away" as used in this application relates to the rate of disappearance in the mouth. The get-away of butter is good, since it disappears almost as soon as put in the mouth. The property of get-away may be measured fairly accurately by persons experienced in organoleptic evaluations by comparing the mouth-feel of a given substance with that of butter.

This invention relates to certain procedures and ingredients which we have found to improve the get-away of oleaginous spreads such as certain of those described in the application previously mentioned.

The practice of this invention involves the combination of (1) the presence of a phosphatide of a type and proportion which will be hereinafter discussed in detail and (2) a heat treatment of the phosphatide containing composition which develops in the spread the desirable physical properties heretofore mentioned. The effect of one of these factors, alone, will not ordinarily produce the desired properties. For example, effect of the eliminating of the phosphatide ingredient in spreads is illustrated below. Likewise elimination of the heat treatment is shown to result in spreads having one or more undesirable physical properties.

In general, the manufacture of the spread characterizing this invention involves mixing the ingredients, an edible glyceride oil in major proportion, and a fat acid monoglyceride in minor proportion, together with a phosphatide. The mixing is carried out above the melting point of the mixture of ingredients, and after mixing is completed the temperature of the product is caused to drop rapidly to the point of formation of microcrystals. This point is reached usually at a temperature at about 70° F. or lower. It may be as high as 75° F., the important feature being the formation of microcrystals.

As thus prepared, the oleaginous spread develops a poor mouth-feel and poor get-away.

We have discovered that heat treatment or "tempering" of the prepared product modifies its physical structure in such a way as to render its texture completely smooth and to improve the get-away to a score almost equal to that of butter. This heat treatment, it will be understood, should be carried out upon the product containing the phosphatide, particularly in formulations containing over 13 percent monoglyceride, for the combination of the two factors lead to the success of the treatment. Even in the absence of the phosphatide, however, the heat treatment does have some beneficial effect, but it is not nearly as striking or permanent. Another, and important, feature of our invention is that the desirable plasticity of the oleaginous spreads containing phosphatides is retained upon storage for long periods of time, whereas spreads which do not contain phosphatides tend to become hard and lose plasticity.

The heat treatment consists of heating the product in open or sealed cans or other suitable containers at a temperature of 90° to 140° F. for a period of 3 to 48 hours, the higher temperature corresponding to the shorter time.

The formulations comprise 70 to 90 percent edible glyceride oil, 9 to 30 percent fat acid monoglyceride and one-tenth to 2 percent phosphatide. They also include salt, color, flavor, preservative, and vitamins. They may or may not contain a fat acid ester of a polyalkylene glycol, as disclosed in the aforementioned copending application. The edible oil used may be soybean oil, cottonseed oil, peanut oil, corn oil, safflour oil, and the like and the glyceride ester may be glyceryl monostearate, glyceryl monopalmitate, the monoglyceride of completely hydrogenated edible oils such as cottonseed oil, soybean oil, lard or mixtures of these various monoglycerides.

Instead of the pure monoglyceride, we may use commercial preparations containing minor amounts, say up to 5 to 8 percent of diglyceride. The presence of more than about 8 percent diglyceride based on monoglyceride, appears to nullify the effects of our treatment. Thus, spreads containing mixtures of monoglyceride and diglyceride in which the diglyceride is more than 8 percent of the diglycerides do not respond so favorably to our novel treatment.

The phosphatides may be refined soybean phosphatide, soybean lecithin, corn lecithin or phosphatide and the like. The quantities of salts, flavor, color and the like, of course, depend upon the properties desired in the final product.

The preferred conditions of our process are to use 80 to 90 percent edible glyceride oil such as soybean oil, cottonseed oil, or peanut oil, 9 to 19 percent glyceryl monostearate which may contain up to 6 or 7 percent glyceryl distearate based on the monostearate, and 0.1 to 0.4 percent soybean lecithin or corn lecithin. We may incorporate also 1 to 3 percent salt in finely divided form and the flavors, colors and other ingredients shown in Table I, below. Our preferred conditions of heat treatment or tempering is to subject this mixture to 100° F. to 120° F. for a period of 12 to 48 hours.

In the following examples data will be given showing the novel effect of the combination of the phosphatide factor and the heat treatment. The get-away evaluations appearing in the tables were determined by a panel of experienced analytical tasters. The score assigned is based upon a score for butter, the higher score corresponding to the poorer get-away.

The penetration measurements were made with an A. S. T. M. precision universal penetrometer equipped with a standard size and standard shape penetration cone. The spindle and cone were made of aluminum, so that the total weight was 26 gms. Spreads having a penetration of over 6 mm. are spreadable, whereas those having penetrations greater than 20 mm. are relatively soft. The desirable range was found to be 15–20 mm. for the best spreading characteristics.

The equipment used for preparing our spread consisted of a jacketed mixing kettle of 2 gallons capacity, a means for introducing nitrogen into the material as it is drawn to a pump, a gear pump, a Votator cooling unit and provision for canning under nitrogen. The cylinder of the Votator was constructed of nickel with plastic scraper blades. Other equipment was stainless steel.

The constituent materials for preparing a spread are shown in Table I below. They were added to the mixing kettle, heated to about 170° F. and then pumped to the Votator from which the spread issued in a fluid stream. There was no pressure valve on the discharge side of the Votator and the material flowed readily and evenly into containers. After a few minutes the mass began to harden.

TABLE I

*Composition of spread*

| Ingredients | Parts |
| --- | --- |
| Soybean salad oil or winterized cottonseed oil | 83. |
| Distilled monostearate | 17. |
| Soybean phosphatides (oil free) | 0.2. |
| Salt | 2.5. |
| Butter colors 3 and 4 | 0.0025. |
| Butter flavor concentrate | .04. |
| Propyl gallate | .01. |
| Citric acid | .005. |
| Vitamin A | 1,650,000 units/lb. |
| Vitamin D | 330,000 units/lb. |

The pump used was a Zenith gear pump with a capacity of 12 gallons per hour. The Votator had a 3-inch diameter chamber with 90 square inches of heat transfer area and, operating under these conditions at the above rate, it was not necessary to employ refrigeration. Cooling water at 60° F. was adequate for chilling to the point of crystallization.

Table II gives the operating conditions for a typical pilot-plant run. It may be calculated from these data that the heat transfer coefficient in the Votator is nearly 200. Under the conditions described, the Votator is operated at only about 20 percent of its maximum capacity. The change in enthalpy for a typical global spread between 161° F. and 75° F. is 65.3 B. t. u./pound under conditions of rapid chilling. From theoretical considerations this indicates that little, if any crystallization of the oil component occurs, for example, as an eutectic with the monostearate fraction.

TABLE II

*Operation conditions for preparing spread in a pilot-plant unit*

| | |
| --- | --- |
| Temperature of cooling water into Votator | 64.7° F. |
| Temperature of cooling water out of Votator | 66.5° |
| Temperature of spread into Votator | 161° |
| Temperature of spread out of Votator | 75° |
| Flow rate of cooling water | 2,540 lbs./hour. |
| Flow rate of spread | 70.0 lbs./hour. |
| Speed of Votator rotor | 670 R. P. M. |
| Heat transfer area | 89.2 sq. in. |

Preliminary tempering tests of these spreads were conducted in air circulating ovens adjusted at 90° F., 112° F., and 130° F. Penetration measurements were made after 1½ hours, 3 hours, and 24 hours at these temperatures. After completion of the tempering period samples were removed from the oven and periodic determinations of penetration were continued under 75° C. storage until the samples apparently assumed constant firmness, usually in about 100 hours. An untempered or control sample was held at 75° F. and penetration values were determined for a similar length of time. Final penetration values reported in the tables below are obtained as described above except as otherwise specified.

The results of organoleptic and penetration tests indicated that the same tempering phenomena were occurring under the three experimental temperatures selected but at different rates. Since our novel spreads contain more than 80 percent liquid vegetable oil, tempering should be carried out under mild conditions so as to minimize the development of undesirable flavors. We selected the intermediate temperature of 112° F. as the temperature of tempering in most of the following examples. It is to be understood, however, that the heat treatment will be successful at any temperature within the designated range of 90–140° F.

Table III lists penetration data and get-away scores of several spreads made up with winterized cottonseed salad oil as the glyceride oil and the distilled monoglycerides of completely hydrogenated lard as the monoglyceride, i. e. without the phosphatide ingredient. The data are presented here for comparison purposes. Reference to the table shows, for example, that the 13 percent monoglyceride spread when freshly made had a penetration value of 29.7 mm. which on standing 100 hours at 75° F. had dropped to 16.3 mm. On tempering at 112° F. the plasticity progressively increased to 21.1 mm., 22.8 mm., and 25.3 mm. after 1 hour, 3 hours, and 24 hours, respectively. The 24-hour tempered sample, 100 hours after removal from the oven, hardened to 18.5 mm., and the organoleptic sample was given an excellent get-away score of 1.0. In view of the satisfactory get-away of this spread it would seem that it was of a satisfactory composition. However, when the product was stored for extended periods of time the penetration decreased, and the get-away score was adversely affected.

TABLE III

*The effect of monoglyceride content on penetration and getaway of tempered spreads*

| Percent Monoglyceride | Untempered penetration at 75° F. | | Penetration at 112° F. after— | | | Tempered 24 hours at 112° F. | |
| --- | --- | --- | --- | --- | --- | --- | --- |
| | Initial | Final | 1 hour | 3 hours | 24 hours | Final penetration at 75° F. | Getaway score |
| 13 | 29.7 | 16.3 | 21.1 | 22.8 | 25.3 | 18.5 | 1.0 |
| 15 | 24.7 | 14.2 | 21.5 | 22.0 | 21.0 | 16.2 | 1.8 |
| 18 | 22.6 | 10.3 | 19.5 | 18.4 | 17.9 | 13.3 | 2.6 |
| 30 | 18.1 | 4.5 | 11.2 | 7.4 | 6.8 | 4.5 | 3.5 |

The influence of monoglyceride content is shown by the increase in initial and final firmness of the untempered control as well as the final firmness of the tempered sample. Samples containing over 15 percent monoglyceride became progressively firmer during their retention in the tempering oven.

The following examples show the effect of the presence of phosphatides. Typical preparations for a series of tests were made up as shown in Tables I and II using winterized cottonseed oil. Samples from several such preparations were placed in the tempering oven and subsequently removed at intervals and held at 75° F. until penetration measurements tended to be constant.

The data in Table IV show that minimum get-away score and maximum penetration fall within the 12-hour to 48-hour tempering period, and that the undesirable increase in firmness usually caused an increase in get-away score after 1 month to 2 months storage at 112° F. In contrast, non-phosphatide containing spreads develop these undesirable characteristics in a much shorter period of time.

TABLE IV

*Tempering spreads containing 17% monoglyceride and 0.2% phosphatide*

| Tempering time at 112° F., days | Getaway score | Penetration, mm. |
|---|---|---|
| 0 | 2.7 | 15 |
| ½ | 1.4 | 17 |
| 1 | 1.3 | 17 |
| 1½ | 1.6 | 17 |
| 2 | 1.6 | 16 |
| 28 | 1.9 | 17 |
| 56 | 2.6 | 14 9 |

In another series of tests the phosphatide was varied in spreads of Table I. The spreads were tempered 24 hours at 112° F. and then held 100 hours at 75° F. whereupon final penetration values were determined. The spreads showed a progressive softening with increasing amount of phosphatide up 0.2 percent phosphatide. Concentrations above 0.2 percent did not show further significant softening. Get-away scores improved with increasing phosphatide concentration and leveled off at about 0.2 percent. The results are shown in Table V.

TABLE V

*The effect of phosphatide concentration on penetration and getaway of spreads containing 18% monoglyceride*

| Percent Phosphatide | Untempered penetration at 75° F. | | Penetration at 112° F. after— | | | Tempered 24 hours at 112° F. | |
|---|---|---|---|---|---|---|---|
| | Initial | Final | 1 hour | 3 hours | 24 hours | Final penetration at 75° F. | Getaway score |
| 0 | 22.6 | 10.3 | 19.5 | 18.0 | 17.9 | 13.3 | 2.6 |
| 0.01 | 19.8 | 10.1 | 20.3 | 19.3 | 18.1 | 13.1 | 2.4 |
| 0.1 | 17.9 | 10.1 | 20.0 | 20.0 | 20.1 | 15.9 | 2.0 |
| 0.2 | 15.1 | 8.9 | 18.9 | 20.7 | 22.1 | 17.4 | 1.2 |
| 0.4 | 9.3 | 8.7 | 20.7 | 22.5 | 23.4 | 16.5 | 1.5 |

Table VI shows the effect of our treatment on spreads of varying concentrations of monoglyceride.

TABLE VI

*The effect of variable monoglyceride content on penetration and getaway at 0.2% phosphatide*

| Percent Monoglyceride | Untempered penetration at 75° F. | | Penetration at 112° F. after— | | | Tempered 24 hours at 112° F. | |
|---|---|---|---|---|---|---|---|
| | Initial | Final | 1 hour | 3 hours | 24 hours | Final penetration at 75° F. | Getaway score |
| 17 | 24.5 | 8.5 | 23.5 | 23.0 | 24.0 | 17.5 | 1.2 |
| 18 | 15.1 | 8.9 | 18.9 | 20.7 | 22.1 | 18.1 | 1.4 |
| 22 | 16.1 | 6.9 | 15.9 | 17.1 | 17.1 | 14.1 | 2.6 |

The get-away scores referred to in the various tables in this specification were obtained by a panel of 15 experienced analytical tasters. For scoring, a 9-point balanced scoring system was adopted containing 0 as the ideal score. The degree of deviation from the ideal was determined and scored on the basis of 4 units above and 4 below. Even though this system would require that scores inferior to the ideal to negative, and those superior, positive, all scores are reported herein as positive values. This is done to avoid the confusion of carrying a negative sign. Moreover, all scores, based on butter as the ideal for get-away and flavor, have been negative.

Comparative evaluations were made using three commercial margarines, an Army margarine formulation, and the spreads of this invention. The spreads, designated in Table VII as A, B, and C were prepared in accordance with Tables I and II above and were tempered at 112° F. for 24 hours.

The results of the comparisons of get-away are summarized in Table VII. Included also in Table VII are penetration data measured at 75° F. and at 34° F. The penetration measurements at 34° F. were made using a 93-gram load in the Penetrometer instead of the 26-gram load.

TABLE VII

*Average "getaway" scores for spreads*

| Spread | No. of panel evaluations | Average score | Penetration | |
|---|---|---|---|---|
| | | | 75° F. | 34° F. |
| Butter | 2 | .12 | 20.2 | 1.8 |
| Margarine A | 8 | .85 | 14.0 | 2.0 |
| Margarine B | 6 | 1.4 | 9.3 | 2.0 |
| Margarine C | 8 | 1.0 | 16.1 | 1.7 |
| Spread A | 5 | 1.4 | 14.6 | 10.1 |
| Spread B | 8 | .83 | 17.4 | 13.9 |
| Spread C | 5 | 1.1 | 17.4 | 14.0 |
| Army margarine | 4 | 3.0 | 11.7 | 1.5 |

The spreads made according to this invention find use for other food purposes. They may be blended with other oleaginous materials for the purpose of making blended spreads. However, the blended spreads do not possess the wide range of plasticity of our novel spread. Table VIII presents a variety of blends in accordance with this feature of the invention. The spread used for blending was prepared in accordance with Table I and II, followed by tempering at 112° for 24 hours.

TABLE VIII

*Spread mixtures*

| Spread composition, percent | Acceptability score | Penetration [1] | |
|---|---|---|---|
| | | 75° F. | 34° F. |
| 70 margarine, 30 spread | 0.4 | 17.5 | 1.9 |
| 80 margarine, 20 spread | .5 | 18 | 1.9 |
| 90 margarine, 10 spread | .9 | 15 | 1.6 |
| 40 butter, 60 spread | .9 | 25.5 | 2.0 |
| 70 butter, 30 spread | .6 | 24.2 | 1.6 |
| 100 butter, 0 spread | 1.2 | 20.2 | 1.4 |
| 100 margarine | 1.1 | 12.2 | 1.5 |
| 100 spread | 1.4 | 21.9 | 16.9 |

[1] Penetrations at 34° F. with a 93-gram spindle and at 75° F. with a 26-gram spindle.

In the foregoing table the column headed "Acceptability Score" represents general organoleptic acceptance. The scoring was made by a panel of experienced analytical tasters, and the score was arrived at by taking into consideration such factors as consistency, flavor, mouth-feel, get-away and related physical properties which affect all-around acceptance of the spread. The scoring was made with 0 as the ideal on an 0 to 4.0 scale.

We claim:

1. The process comprising admixing 70 to 90 percent edible glyceride oil, 9 to 30 percent fat acid monoglyceride and 0.1 to 2.0 percent phosphatide at a temperature above the melting point of the mixture of ingredients, cooling said mixture rapidly to the point of formation of microcrystals, and subjecting said cooled mixture to a temperature of 90° to 140° F. for a period of 3 to 48 hours.

2. In a process for making an edible oleaginous spread which comprises admixing 70 to 90 percent edible glyceride oil, 9 to 30 percent fat acid monoglyceride and 0.1 to 2.0 percent phosphatide at a temperature above the melting point of mixture of ingredients and rapidly cooling the mixture to the point of formation of microcrystals, the step which comprises subjecting said cooled mixture to a temperature of 90 to 140° F. for a period of 3 hours to 48 hours.

3. The process comprising admixing about 80 to 90 percent cottonseed oil, 9 to 12 percent distilled monoglycerides of completely hydrogenated lard and 0.1 to 0.4 percent soybean phosphatides together with minor proportions of salt, flavoring and antioxidants at a temperature above the melting point of the mixture of ingredients, rapidly cooling the mixture to 75° F. and subjecting the cooled mixture to a temperature of 100° to 120° F. for a period of 12 to 48 hours.

4. The process comprising admixing about 80 to 90 percent soybean salad oil, 9 to 19 percent distilled glyceryl monostearate and 0.1 to 0.4 percent soybean phosphatides together with minor proportions of salt, flavoring and antioxidants at a temperature above the melting point of the mixture of ingredients, rapidly cooling the mixture to 75° F. and subjecting the cooled mixture to a temperature of 100° to 120° F. for a period of 12 to 48 hours.

5. Product of the process of claim 3.
6. Product of the process of claim 4.

References Cited in the file of this patent

UNITED STATES PATENTS

| | | |
|---|---|---|
| 1,965,142 | Hall et al. | July 3, 1934 |
| 1,984,470 | Farrell | Dec. 18, 1934 |
| 2,280,427 | Thurman | Apr. 21, 1942 |
| 2,402,690 | Stanley | June 25, 1946 |